J. T. KNAUS.
POTATO CUTTER.
APPLICATION FILED JUNE 28, 1922.

1,431,310.

Patented Oct. 10, 1922.
2 SHEETS—SHEET 1.

Inventor
J. T. Knaus
By William J. Jacobi
Attorney

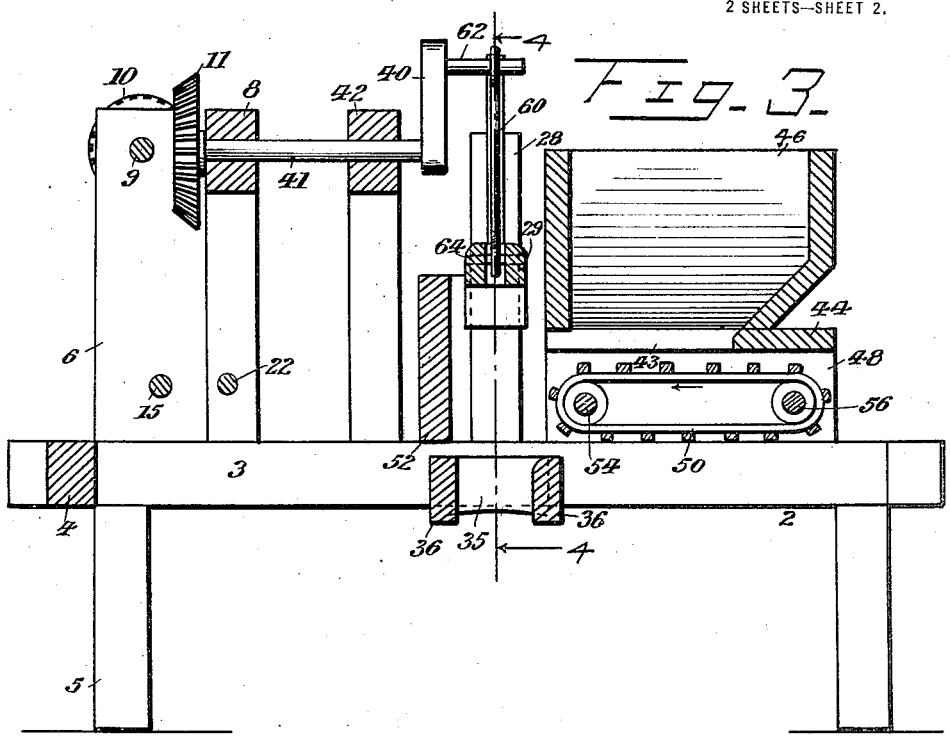
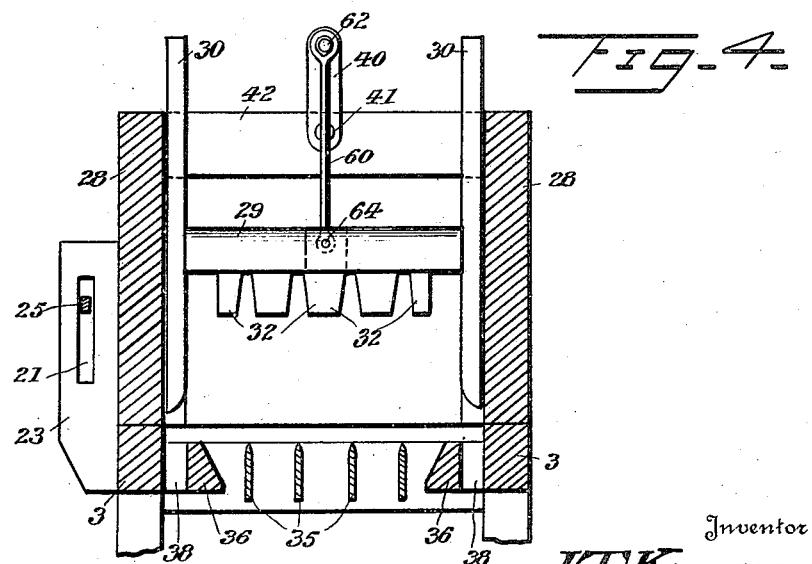

Patented Oct. 10, 1922.

1,431,310

UNITED STATES PATENT OFFICE.

JOHN T. KNAUS, OF GRAFTON, NORTH DAKOTA.

POTATO CUTTER.

Application filed June 28, 1922. Serial No. 571,484.

*To all whom it may concern:*

Be it known that JOHN T. KNAUS, a citizen of the United States of America, residing at Grafton, North Dakota, in the county of Walsh and State of North Dakota, has invented certain new and useful Improvements in Potato Cutters, of which the following is a specification.

This invention relates to a seed potato cutting machine adapted for the purpose of dividing into small pieces for planting, potatoes containing what are known as the "eyes."

The principal object of the invention is to provide a simple power driven machine which will effectually handle and automatically feed and cut large quantities of potatoes in a rapid manner and will require only the attention of a single operator.

A further object of the invention is to provide a machine in which the feeding mechanism which delivers the potatoes to the knives, is operative only upon the inactive stroke of the plungers.

Further features reside in the peculiar arrangement of driving mechanism and the details of the feeding, cutting and operating mechanisms for each, the advantage and utility of which will be familiar to those skilled in this art.

In the drawings,

Figure 3 is a vertical sectional view on the line 3—3 of Figure 1, and

Figure 4 is a transverse vertical sectional view on the line 4—4 of Figure 3.

Figure 1:
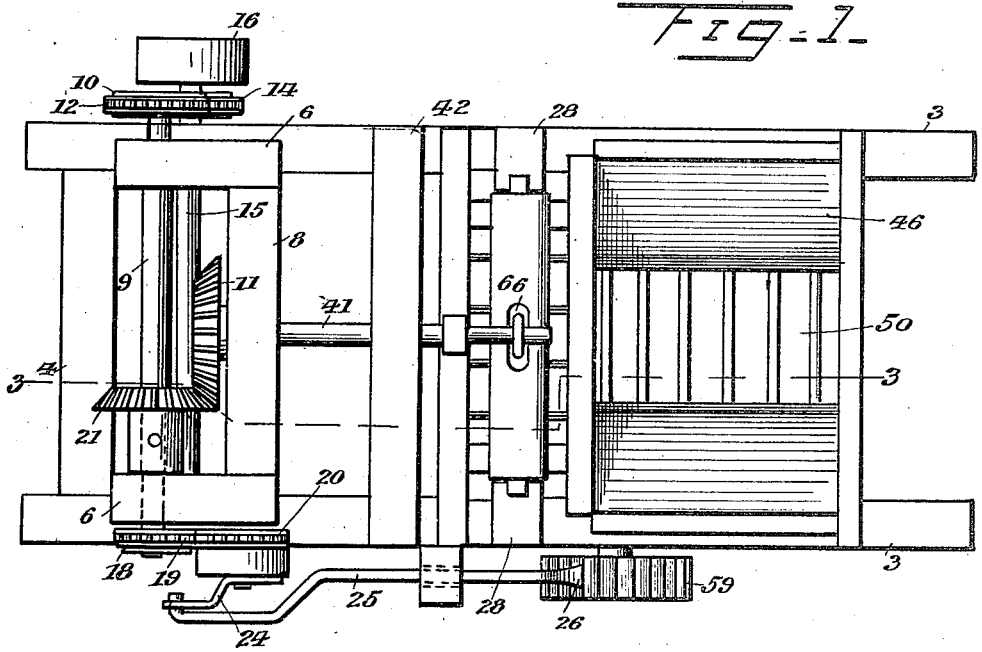
Figure 1 is a top plan view of the complete machine.

Referring now more particularly to the drawings by numerals of reference, 2 indicates generally the frame of the machine, or stand upon which it is mounted and embodying side longitudinal beams 3, transverse brace beams 4 and supporting legs 5.

Rising vertically above one end of the frame 2, for sake of description I will refer to as the front end are a pair of vertical standards 6, located respectively upon opposite sides of said frame and rigidly secured to the longitudinal beams in any suitable manner. These standards are connected at their rear by a combined spacing and bearing block 8.

Journaled in the upper forward ends of said standards 6 is a transverse shaft 9 having keyed upon one end beyond the standard 6, a sprocket wheel 10, which through a sprocket chain 12 is driven from a sprocket wheel 14 fixed on a main or drive shaft 15 journaled in the lower portion of the said standards, said drive shaft also carrying a pulley 16 which may be driven from a suitable source of power such for instance as a low horse-power gasoline engine or electric motor.

Upon the opposite end of the shaft 9 from which the sprocket wheel 10 is situated, and outside the standard 6, is keyed or splined a sprocket wheel 18, which through a sprocket chain 19 drives a sprocket wheel 20 fixed on a counter shaft 22 journaled in the lower portion of the standards 6, and parallel with the aforementioned drive or main shaft 9.

Upon the outer face of the sprocket wheel 20, and so fixed as to turn therewith is a suitable form of crank arm 24, apertured at its outer end to receive the wrist-pin of an arm 25 having at its rear end, a pawl 26, adapted to co-operate with a ratchet wheel 59 fixed upon the outer end of a roller 54 journaled transversely in the supporting members 48 of a hopper 46, and the purpose of which will be later described. The arm 25 is guided during its movements within a slot 21 of a vertical bar 23 fixed to the side of the frame.

About midway the length of the machine frame, and vertically reciprocable within vertical guide bars 28 arranged respectively upon the longitudinal beams 3 upon opposite sides of the frame is a cross-head 29 provided with lateral guides 30 which slide within the guide bars 28, and upon its lower face with a series of spaced plungers 32 which intermittently force or press the potatoes delivered from the hopper 46, onto a transverse series of stationary knives 35 supported at their ends within transverse bars 36 supported by the side beams 3. The ends of the bars 36 are recessed at 38 to co-operate with the lower ends of the guides 30 which pass therethrough and serve as a centering and steadying means for the cross-head during the operation of pressing the potatoes through the knives 35.

Vertical reciprocatory movement is imparted to the cross-head 29 through the medium of a crank 40 carried by a crank shaft 41 journaled at its ends, respectively within an elevated transverse bar 42 and the previously mentioned combined spacing and bearing block 8, said crank shaft having keyed upon its forward end in advance of said block a bevel gear 11 which meshes with a companion bevel gear 21 fixed on and for rotation with the shaft 9. The crank 40 is connected with the cross-head 29, through a rod or link 60 having an eye at its upper end through which loosely passes the crank pin 62, the lower end of said rod being also provided with an eye through which loosely passes a pin 64 set transversely across a recess 66 in the cross-head.

Beneath the delivery opening 43 in the floor 44 of the hopper 46 mounted on the elevating supports 48 upon the upper faces of the side beams 3, and adjacent the rear end of the frame, is arranged a horizontally traveling, endless, transversely slatted apron or conveyor 50, the forward end of which is so located that it delivers the potatoes falling thereon from the hopper, directly onto the knives 35 in the path of the plungers, a stop board 52 arranged transversely of the frame just in advance of the knives and plunger serving to prevent the potatoes from falling beyond said knives.

This conveyor or endless belt travels over a pair or rollers 54 and 56, journaled transversely of the frame and within the hopper supports 48, the forward roller 54 having fixed upon its outer end and for rotation therewith, a ratchet wheel 59 previously referred to.

Figure 2:
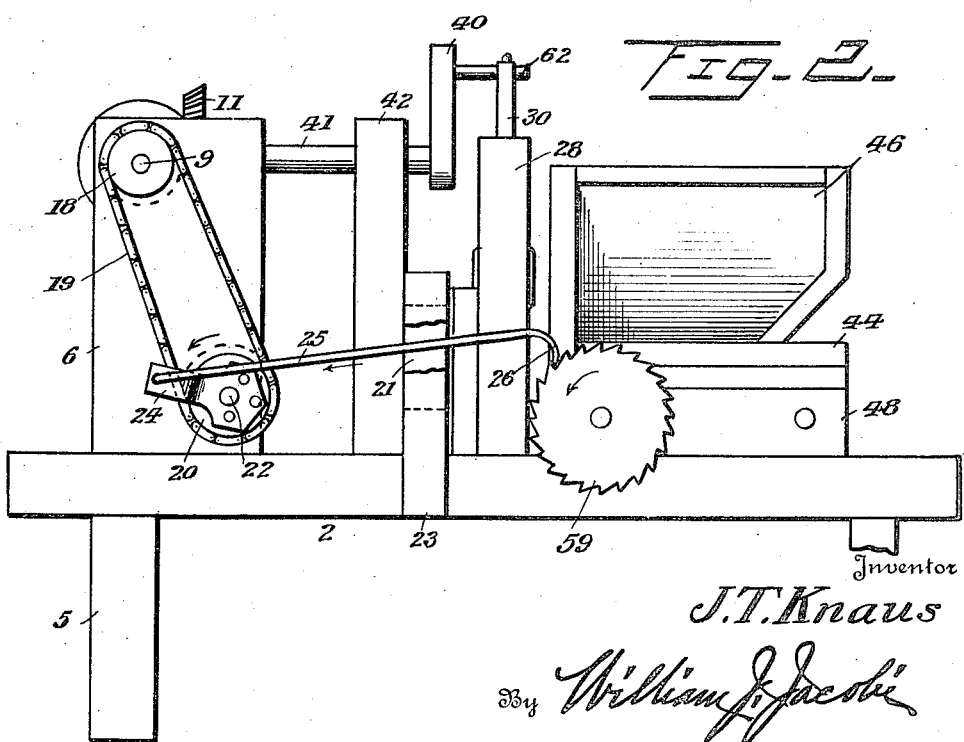
Figure 2 is a side elevation thereof.

The operating parts of the machine are so arranged, and the gears so set that as the cross-head 29 rises to retract the plungers, the sprocket wheel 20 and arm 25 are moving in the direction indicated by the arrows in Figure 2, during which operation, the pawl 26 is rotating the ratchet wheel also in the direction of the arrow to cause the conveyor to simultaneously advance in the direction of the arrow, Figure 3 to deliver the potatoes onto the knives. During the cutting operation, as the cross-head moves downwardly, the arm 25 will move in a direction opposite to that first mentioned, and the pawl 26 will ride idly over the teeth of the ratchet wheel 59, the conveyor there remaining stationary. It will thus be seen that while the plunger driving mechanism is operating continuously, the potato feeding or conveying belt operates intermittently.

It is believed that from the foregoing description, taken in connection with the accompanying drawings, the construction and operation of my invention with be clearly understood.

Having thus described my invention, what I claim as new and desire to protect by Letters Patent is:

1. In a seed potato cutter in combination with a supporting frame, a vertically reciprocable plunger, a series of knives arranged in the frame below said plunger and in the path of movement thereof, a hopper supported upon one end of said frame, a conveyor arranged below said hopper and adapted to receive potatoes from the latter, said conveyor having its delivery end in proximity to said knives, means for continuously operating said plunger, and means for imparting intermittent movement to said conveyor.

2. In a seed potato cutter, in combination with a supporting frame, a vertically movable plunger, a series of vertical knives below said plunger and in the path of movement thereof and arranged transversely of said frame, a stop-board arranged on said frame in advance of said knives and said plunger, means for continuously driving said plunger, a hopper supported on said frame in the rear of said knives and plunger, said hopper having a bottom delivery opening, and endless conveyor mounted on said frame below the delivery opening in said hopper, and means for imparting an intermittent movement to said endless conveyor.

3. In a potato cutter, in combination with a supporting frame, a cross-head arranged transversely of said frame, guide bars for said cross-head, guides carried by said cross-head on opposite ends thereof, a series of spaced plungers upon the lower face of said cross-head, a transversely arranged series of vertical knives, bars carried by said frame side members in which said knives are mounted, a stop board arranged in advance of said knives and said plungers, a hopper having a delivery opening in its bottom, an endless conveyor mounted within said frame below said delivery end in proximity to said knives, means for driving said cross-head continuously and means for imparting an intermittent movement to said conveyor.

4. In a seed potato cutter, in combination with the supporting frame, a vertically moving plunger carrying cross-heads, a series of knives arranged in the frame below said cross-head and in the path of movement of said plungers, a hopper supported upon one end of said frame, a conveyor arranged below said hopper and adapted to receive potatoes from the latter, said conveyor having its delivery end in proximity to said knives, means for continuously driving said cross-head and means operated by said cross-head driving means for imparting an intermittent movement to the said conveyor.

5. In a seed potato cutter, in combination with the supporting frame, a feed hopper, a conveyor arranged below said hopper and adapted to receive the potatoes from said hopper, a cross-head arranged transversely of the frame, guide bars for said cross-head, vertical guides carried by the ends of said cross-head and operable within said guide bars, a knife supporting bar mounted in the side members of said frame below said cross-head and carrying a series of vertical knives, said knife supporting bar being provided at opposite ends with guide recesses in alinement with said guides on said cross-head, said guides being adapted when said cross-head is lowered, to pass through said recesses to center and steady the said cross-head, means for imparting a reciprocatory movement to said cross-head and means for intermittently driving said conveyor.

In testimony whereof I affix my signature.

JOHN T. KNAUS.